United States Patent
Burgess et al.

[11] 3,864,972
[45] Feb. 11, 1975

[54] SIGNAL RECOVERY SYSTEM FOR VORTEX TYPE FLOWMETER

[75] Inventors: Thomas H. Burgess, Horsham; Peter J. Herzl, Morrisville, both of Pa.

[73] Assignee: Fischer & Porter Co., Warminster, Pa.

[22] Filed: Mar. 12, 1973

[21] Appl. No.: 340,455

[52] U.S. Cl. ............................................. 73/194 B
[51] Int. Cl. ........................... G01f 1/00, G01p 5/00
[58] Field of Search ....................... 73/194 B, 194 C

[56] References Cited
UNITED STATES PATENTS

| | | | |
|---|---|---|---|
| 3,144,767 | 8/1964 | Testerman et al. | 73/194 B |
| 3,434,344 | 3/1969 | Brunner | 73/194 B |
| 3,587,312 | 6/1971 | McMurtrie et al. | 73/194 B |
| 3,677,067 | 7/1972 | Miller et al. | 73/194 B X |

Primary Examiner—James J. Gill

[57] ABSTRACT

A signal recovery system coupled to the sensor of a vortex-type flowmeter wherein fluidic variations are induced whose frequency is a function of the flow rate of the fluid. The sensor yields an electrical signal containing a fundamental frequency proportional to the fluidic variations as well as frequency components or noise arising from turbulence in the fluid admitted into the flowmeter. The recovery system includes a voltage-controlled band-pass filter coupled to the sensor to transmit only those frequencies which lie within a narrow range whose center frequency is determined by the applied control voltage and to discriminate against all other frequencies. In order to recover the fundamental frequency from the sensor output and to reject frequencies reflecting hydraulic noise, a control voltage is generated whose level is a function of the existing velocity of the fluid passing through the meter, the control voltage being applied to the filter to adjust the band-pass setting thereof so that the center frequency substantially corresponds to the fundamental frequency in the sensor output. The output of the filter is applied to a Schmitt trigger to provide a square wave whose frequency corresponds to the fundamental frequency, the output of the trigger being indicated to afford a reading of flow rate.

8 Claims, 4 Drawing Figures

SIGNAL RECOVERY SYSTEM FOR VORTEX TYPE FLOWMETER

BACKGROUND OF THE INVENTION

This invention relates generally to vortex-type flowmeters, and more particularly to a signal detection means for such meters for extracting the fundamental frequency representing flow rate and excluding signal components representing fluidic disturbances.

A vortex-type flowmeter is adapted to measure the flow rate of a fluid passing through a conduit by producing fluidic pulses or oscillations whose repetition rate or frequency varies in accordance with flow rate. Two species of vortex-type meters are commercially available in the United States, one being the so-called Swirlmeter type, and another, the bluff-body type. The present invention is not limited to these specific types and is applicable to all forms of hydrodynamic oscillatory metering devices in which fluidic variations are sensed to provide an indication.

In Swirlmeters, such as those described in U.S. Pat. Nos. 3,279,251, 3,314,289 and Re.26,410, among others, a homogeneous fluid whose flow rate is to be measured, is forced to assume a swirl component. This is accomplished by feeding the fluid into the inlet section of a flow tube having a fixed set of swirl blades therein which imparts a swirling motion to the fluid passing therethrough. Downstream of the swirl blades in the tube is a Venturi section which first constricts and then expands the flow passage to transform the swirling motion into precessional movement in the expanding region of the Venturi section to create a vortex.

Precession takes place about the central axis of the flow tube at a discrete frequency that is a function of the volumetric flow rate. Cyclic variations in local fluid velocity occurring by reason of precession are detected to provide electrical pulses whose frequency is measured to provide an indication of flow rate.

In commercially available Swirlmeters, detection of the cyclic variations is effected by means of a sensor probe mounted in the body of the meter transversely with respect to the longitudinal axis of the meter in the area where the vortex precession is near the inner wall of the flow tube. At the tip of the sensor probe is a heated thermistor which serves to detect the frequency of precession. A thermistor is a solid-state device made of a semi-conducting oxidic material that exhibits a high negative temperature coefficient of resistivity whereby the resistance of the device increases rapidly with decreasing temperature.

In the Swirlmeter, the thermistor is caused to operate in its self-heat region by applying a constant current thereto to heat the thermistor to a temperature above that of the fluid flowing through the meter. For a given fluid velocity, the thermistor is caused by the fluid passing thereby to undergo an appreciable increase in resistance by means of the cooling effect produced by the fluid stream.

Inasmuch as the current applied to the thermistor is maintained constant, an increase in its resistance will be effective as an increase in voltage. Any increase in velocity such as that produced by a fluidic vortex will further cool the thermistor, giving rise to a further increase in voltage. The voltage variations developed in the thermistor circuit as a result of the cyclic variations in local fluid velocity have a frequency depending on flow rate and constitute the output signal. The fluidic variations may also be sensed by a pressure-responsive transducer, such as a diaphragm or piezoelectric crystal type. Or the sensor may be of the force-responsive type such as a strain gauge.

In the bluff-body type of vortex meter, such as that described in U.S. Pat. Nos. 3,116,639 and 3,587,312, the body is mounted within the flow conduit transversely with respect to the flow axis thereof to create fluidic oscillations whose frequency is proportional to flow rate. In U.S. Pat. No. 3,587,312, these fluidic oscillations are detected by a pair of heated thermistors operating in a manner similar to that disclosed above in connection with the Swirlmeter. Other types of bluff-body flowmeters are disclosed in U.S. Pat Nos. 3,116,639 and 3,587,312. The invention is also applicable to vortex-type meters in which the obstacle in the conduit is positioned along the flow axis.

In a vortex-type flowmeter, in addition to the periodic fluidic variations which are induced within the meter, fluidic variations may be present which arise from flow disturbances such as turbulence created in the fluid before it is admitted into the flow tube. For example, where the meter is installed in the exhaust of an internal combustion engine of the reciprocating piston type to measure the flow rate of the exhaust, the exhaust is normally characterized by pressure pulsations and a high degree of turbulence.

In this situation, the meter sensor responds not only to fluidic variations that reflect the rate of fluid flow, but also to the hydraulic noise present in the flow. As a consequence, the output signal yielded by the sensor is contaminated by a noise component which, in some instances, may be considerable, making it difficult to obtain an accurate reading of flow rate.

SUMMARY OF INVENTION

In view of the foregoing, it is the main object of this invention to provide in conjunction with a vortex-type flowmeter, a signal recovery system for extracting the fundamental frequency of interest and for rejecting noise components.

More specifically, it is an object of this invention to provide a signal recovery system which is coupled to the sensor of a vortex type meter, such as a Swirlmeter, and functioning to derive from the sensor an accurate frequency output from a complex sensor signal containing a fundamental frequency representing the frequency of the vortex precession or shedding phenomenon and frequencies representing flow turbulence of hydraulic noise.

Also an object of the invention is to provide a low-cost, and relatively simple signal recovery system which operates reliably and efficiently in high turbulence flow environments.

Briefly stated, these objects are accomplished in a signal recovery system operating in conjunction with a vortex-type flowmeter that includes a flow tube having a vortex producing element therein to induce fluidic variations whose fundamental frequency is a function of the flow rate of the fluid in passing through the tube and a sensor to detect these variations to yield corresponding electrical signals.

The recovery system is provided with a voltage-controlled band-pass filter coupled to the output of the sensor to transmit only those frequencies which lie within a narrow range whose center frequency is determined by the control voltage applied to the filter and to attenuate or discriminate against all other frequencies. In order to transmit the desired frequencies, a control voltage is generated whose level is a function of the existing flow velocity, the control voltage being applied to the filter to adjust the bandpass setting thereof so that the center frequency thereof substantially corresponds to the fundamental frequency. The output of the band-pass filter is applied to a Schmitt trigger to produce square wave output pulses at a repetition rate corresponding to the fundamental frequency, the frequency of these pulses being indicated to provide a reading of flow rate.

In one embodiment of the invention, where the vortex-type meter is coupled to the exhaust of an internal combustion engine of the reciprocating piston type, the control voltage for the band-pass filter is derived from a dynamic characteristic of the engine such as its RPM or its throttle position in combination with RPM, the resultant D-C voltage being a function of the velocity of the exhaust from the engine.

In another embodiment of the invention, means are provided which are responsive to the amplitude of the sensor signal, the amplitude varying as the square of the flow velocity. The amplitude of the sensor signal therefore reflects the flow velocity and the fundamental frequency. On the basis of this amplitude, a control voltage is developed which is applied to the band-pass filter to adjust its center frequency so that it corresponds substantially to the fundamental frequency.

OUTLINE OF DRAWING

For a better understanding of the invention as well as other objects and further features thereof, reference is made to the following detailed description, to be read in conjunction with the accompanying drawings, wherein.

DESCRIPTION OF INVENTION

First embodiment.

Figure 1:
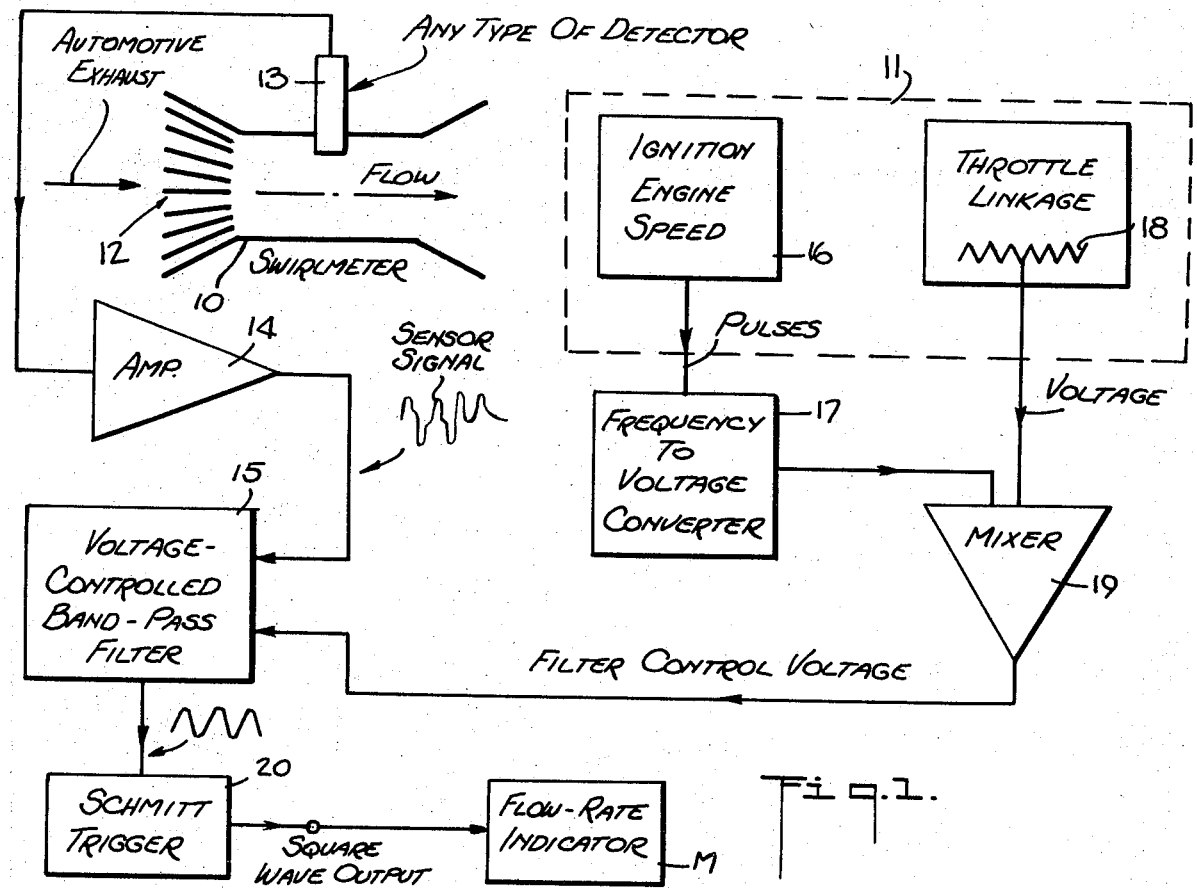
FIG. 1 is a block diagram showing a first embodiment of a signal recovery system in accordance with the invention for extracting the fundamental frequency from the sensor output of a vortex-type meter and for rejecting all other frequencies.

Referring now to FIG. 1, there is shown a preferred embodiment of a signal recovery system operating in conjunction with a vortex-type flowmeter to extract the fundamental frequency from the sensor output and to reject all other frequencies, whereby the meter is rendered insensitive to noise and turbulence. By way of example, the vortex type meter shown is of the Swirlmeter type and includes a flow tube 10 for conducting the fluid whose flow rate is to be measured. In this instance, the fluid to be metered in the exhaust from an internal-combustion engine, generally designated by numeral 11.

The Swirlmeter is provided at its inlet with a fixed set of swirl blades 12 which impart a swirling motion to the exhaust fluid passing therethrough. Cyclic variations in local fluid velocity occurring by reason of precession are detected by a sensor 13 to provide an electrical signal having a fundamental frequency which represents flow rate and frequencies which reflect fluidic turbulence or noise.

The output of the sensor is fed through an amplifier 14 to the input of a voltage-controlled band-pass filter 15 adapted to pass a narrow range of frequencies, the center frequency of the range depending on the applied control voltage. Thus, by varying the amplitude of the control voltage, one may shift the pass range in either direction to capture the fundamental frequency representing flow-rate.

In order to transmit the fundamental frequency representing flow rate and to discriminate against other frequencies, it is necessary to set the band-pass filter to a frequency range encompassing the predicted position of the fundamental frequency. In the case of an internal-combustion engine, this is accomplished by generating a control voltage for the band-pass filter which is related to some operating characteristic of the engine. Since the greater the engine speed, the larger the volume of the exhaust, one may derive pulses from the engine ignition system 16 in that the repetition rate of these pulses varies as a function of engine speed. The pulses are fed to a standard frequency-to-voltage converter 17 to produce a d-c voltage whose amplitude is proportional to the pulse repetition rate and hence the engine speed.

Thus, the output of band-pass filter 15 contains the fundamental frequency and those noise frequency components which fall within the pass range. But since the frequencies of the noise components are dispersed throughout a broad spectrum, the amplitude of the fundamental frequency is generally greater than the other frequencies passing through the filter.

In order to reject all frequencies, other than the fundamental frequency, the output of filter 15 is applied to a Schmitt trigger 20 or other form of trigger circuit to produce a square-wave output whose frequency is identical to the fundamental frequency. This square-wave output is applied to a suitable frequency meter M calibrated in terms of flow rate to provide the desired reading.

A Schmitt trigger is a bistable trigger circuit that converts an a-c input signal into a square-wave output signal by a switching action triggered at a predetermined point in each positive and negative swing of the input signal. This point is set so as to render the trigger responsive only to the fundamental frequency in the output of the band-pass filter.

Second Embodiment.

Figure 2:
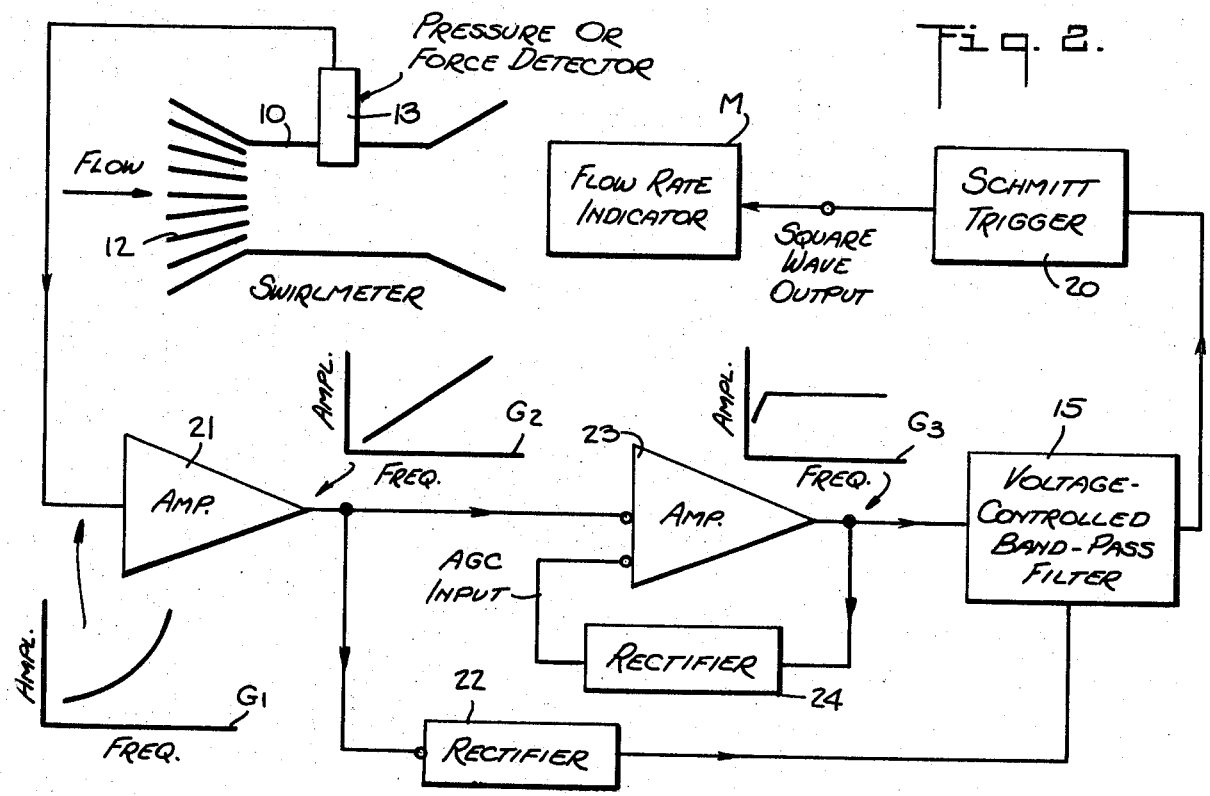
FIG. 2 is a block diagram of a second embodiment of the invention.

Referring now to FIG. 2, there is shown a signal recovery system for a vortex-type meter in which the fluidic variations are detected by a sensor 13 of the pressure or force-responsive type, such as a strain gauge. The force or pressure changes sensed by sensor 13 varies as the kinetic energy content in the vortices which, in turn, varies as the square of velocity. Thus the amplitude of the signal generated by sensor 13 varies as the flow velocity, squared. It therefore becomes possible to exploit the amplitude of the detected signal to determine the flow velocity and the fundamental frequency, and from this amplitude value to center the voltage controlled band-pass filter 15 to transmit the fundamental frequency and to attenuate frequencies reflecting hydrodynamic noise.

The relationship between amplitude and frequency in the signal yielded by the pressure or force sensor 13 is shown in graph $G_1$, where it will be seen that the relationship is somewhat exponential in nature. This sensor signal is applied to an operational amplifier 21 which modifies the amplitude vs. frequency relationship so that it is linear, as shown in graph $G_2$. The output of amplifier 21 is applied to a rectifier 22 which rectifies and filters the a-c output to produce a d-c control voltage that is applied to band-pass filter 15 to set its pass-range so that the center frequency thereof is approximately equal to the fundamental frequency in the output signal of sensor 13.

Since the output of amplifier 21 is a signal whose frequency varies with flow rate and whose amplitude increases as the frequency goes higher, it is desirable to maintain the amplitude at a relatively constant level, for it is only changes in frequency that serve to indicate flow rate. This is accomplished by means of an automatic-gain-control system constituted by a second amplifier 23 coupled to the output of the first amplifier 21, the output of the second amplifier being rectified by rectifier 24 to provide an automatic gain control bias for the second amplifier.

Thus the output of second amplifier 23, which is applied to the input of band-pass filter 15, takes the form shown in graph $G_3$ where it will be seen that the amplitude of the signal is at a steady level throughout the useful frequency range. Alternatively, one may place the automatic gain control system after, rather than before, the band-pass filter. Finally, as in the embodiment illustrated in FIG. 1, the output of band-pass filter 15 is fed to a Schmitt trigger 20 to produce a square-wave output corresponding to the fundamental frequency that represents flow rate. This output is applied to the frequency indicator M calibrated in terms of flow rate.
Third Embodiment.

Figure 3:
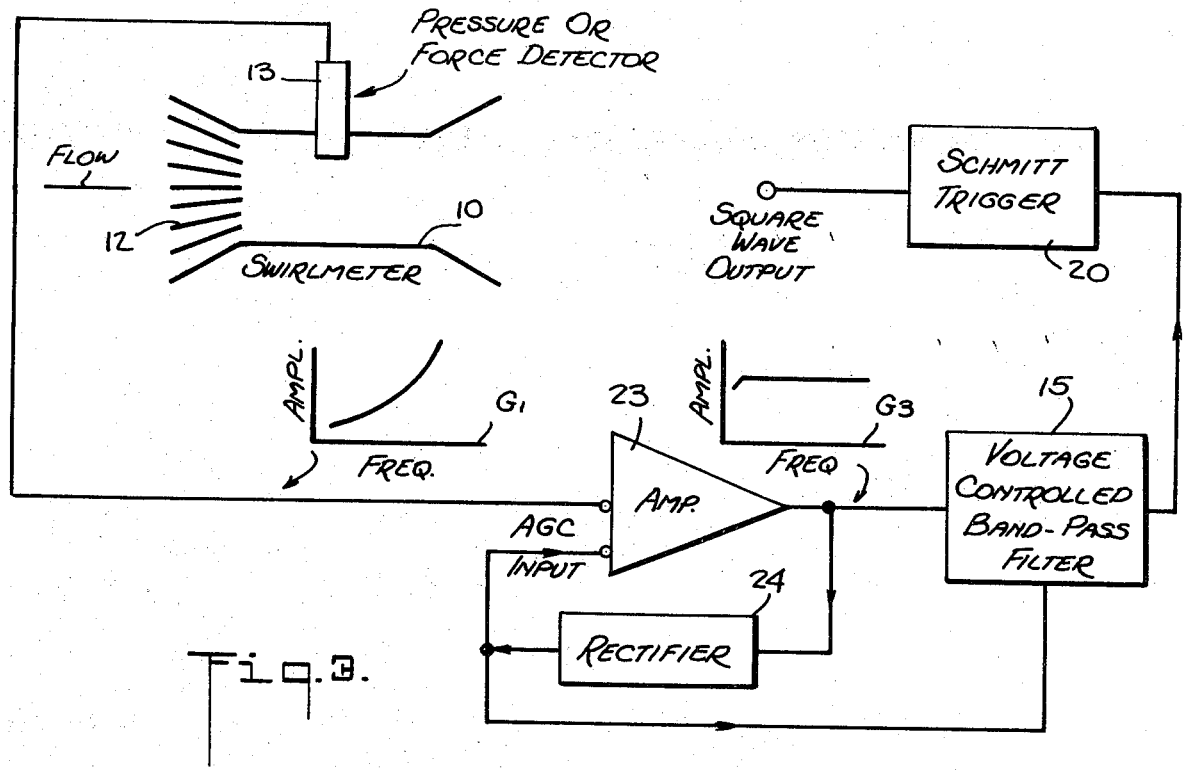
FIG. 3 is a block diagram of a third embodiment of the invention.

FIG. 3 is a simplified version of the signal recovery system shown in FIG. 2. In FIG. 3, the first amplifier 21 is eliminated, for amplification and frequency shaping as well as automatic-gain-control are all carried out in amplifier 23. In this arrangement, rectifier 24, which rectifies and filters the output of amplifier 23 to furnish an automatic-gain-control bias, also serves to provide the control voltage for setting the band-pass filter 15, since this d-c control voltage is also related to the signal amplitude.
Fourth Embodiment.

Figure 4:
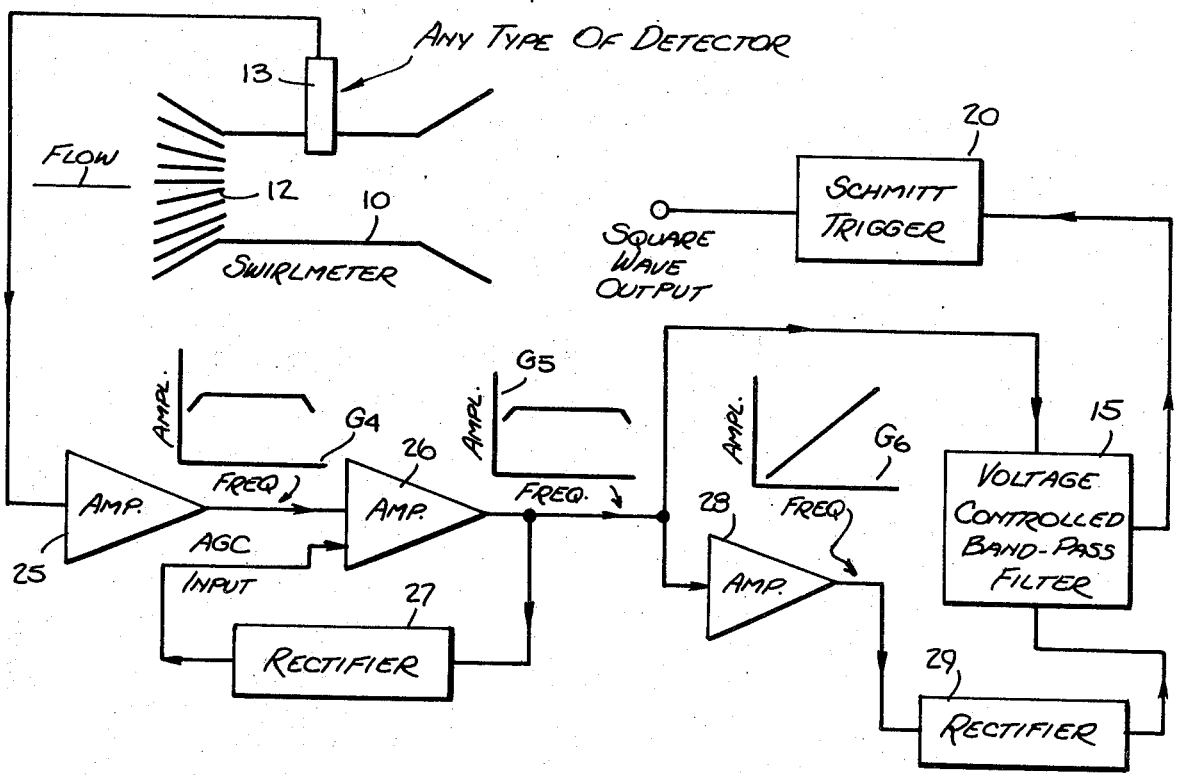
FIG. 4 is a block diagram of a fourth embodiment of the invention.

Referring now to FIG. 4, there is illustrated a signal recovery system which is independent of fluid density changes and is applicable to any form of sensor 13.

In the circuit embodiments shown in FIGS. 2 and 3, should a change take place in the density of the fluid being measured, the signal amplitude of the sensor output will change accordingly, thereby affecting the band-pass filter setting. This limits the utility of the system to these applications where density changes are relatively small and where the band-pass of the filter is made sufficiently wide so that the shift resulting from small density changes does not impair the operation in that the fundamental frequency is still within the band-pass range. But this reduces the effectiveness of the filter, for the broader the band-pass the greater the amount of noise frequencies that are permitted to pass through.

This limitation is overcome in the arrangement shown in FIG. 4 wherein the first amplifier 25 has a frequency response that is so related to the frequency response of sensor 13 that the frequency vs. amplitude relationship of the signal yielded by amplifier 25 is substantially flat throughout the useful frequency range. For example, if the sensor is of the thermistor type, which produces an output whose amplitude declines with an increase in frequency, the amplifier characteristic is made such as to have a reverse curve whereby the amplitude rises as the frequency increases so that the resultant output has a substantially constant amplitude, as shown in graph $G_4$.

The output of amplifier 25 is applied to an automatic-gain-control system formed by a second amplifier 26 whose output is rectified by rectifier 27 to produce an automatic-gain-control bias. Thus the output of amplifier 26, as shown by graph $G_5$, has a constant amplitude throughout the useful frequency range.

The output of amplifier 26 is fed to an operational amplifier 28 whose gain increases in proportion to the frequency of the applied input so that the output of amplifier 28, as indicated by graph $G_6$, has a linear relationship between frequency and amplitude. This output is rectified and filtered by rectifier circuit 29 to provide a d-c control voltage whose amplitude increases in proportion to the frequency of the applied signal. This control voltage is applied to filter 15.

The constant amplitude a-c output of amplifier 26 is applied to band-pass filter 15 which is controlled by the d-c voltage produced by rectifier 29 to adjust the setting of the pass range so that its center frequency is approximately the same as the fundamental frequency in the input signal. The output of band pass filter 15 is applied to Schmitt trigger 20.

The arrangement shown in FIG. 4 has the advantage of being independent of changes in the output signal of sensor 13, for the amplitude of this signal is standardized by amplifier 26. Moreover, the system is workable with any form of vortex-meter sensor.

While there have been shown and described preferred embodiments of a signal recovery system for vortex type flowmeter, it will be appreciated that many changes and modifications may be made therein without, however, departing from the essential spirit thereof.

We claim:

1. A signal recovery system for a vortex-type flowmeter in which the fluid to be measured is directed past a vortex producing element therein to induce fluidic variations whose fundamental frequency is a function of the flow rate, said fluidic variations as well as variations resulting from hydrodynamic noise being detected by a sensor in the form of a pressure or force transducer which yields an electrical signal that varies as a function of frequency; said system comprising:

A. A voltage-controlled band-pass filter coupled to the output of the sensor to transmit only those frequencies which lie within a narrow range whose center frequency is determined by a control voltage applied to the filter, and to attenuate all other frequencies;

B. Means to generate a control voltage having an amplitude related to the velocity of the fluid passing through the flow tube, said means including an amplifier responsive to the sensor signal to produce an output in which a linear relationship exists between frequency and amplitude and means to rectify said amplifier output to produce said control voltage;

C. Means to apply said control voltage to said filter to adjust the band-pass setting thereof so that the center frequency approximately corresponds to said fundamental frequency; and D. Means coupled to the output of the filter and responsive to said fundamental frequency to indicate the flow rate.

2. A system as set forth in claim 1, wherein said last-named means includes a Schmitt trigger to convert the fundamental frequency to a square wave.

3. A system as set forth in claim 1, wherein said vortex-meter is of the type including a set of swirl blades.

4. A system as set forth in claim 1, wherein said vortex-meter is of the type including a vortex shedding body.

5. A system as set forth in claim 1, wherein said vortex-meter is coupled to the exhaust of an internal combustion engine, and said control voltage is derived from an operating characteristic of the engine.

6. A system as set forth in claim 5, wherein said control voltage is produced by means deriving pulses from the ignition system of the engine, and means converting the pulses into a d-c voltage whose amplitude varies as a function of the pulse repetition rate.

7. A system as set forth in claim 1, wherein the output of said amplifier is applied to said band-pass filter through an automatic-gain-control system wherein the signal applied to said filter has a substantially constant amplitude throughout the useful range of the vortex-type meter.

8. A signal recovery system for a vortex-type flowmeter in which the fluid being measured is conducted through a flow tube having a vortex-producing element therein to induce fluidic variations whose fundamental frequency is a function of fluidic flow rate, said fluidic variation and variations resulting from hydrodynamic noise being detected by a sensor which yields an electrical signal, said system comprising:

A. An automatic-gain-control circuit constituted by an amplifier coupled to the output of the sensor and a rectifier coupled between the output and input of the amplifier to provide an automatic-gain-control bias therefor, said amplifier yielding an output in which the amplitude of the signal is substantially constant throughout the useful frequency range;

B. An operational amplifier coupled to said automatic-gain-control circuit to produce an output in which the amplitude varies linearly in proportion to frequency;

C. Means to rectify the output of said operational amplifier to produce a d-c control voltage whose amplitude increases in accordance with the frequency of the applied amplifier output;

D. A voltage-controlled band-pass filter coupled to the output of said automatic-gain-control circuit to transmit only those frequencies which lie within a narrow range whose center frequency is determined by a control voltage applied to the filter;

E. Means to apply the control voltage produced by said rectifier means to said filter to adjust the band-pass setting thereof so that the center frequency thereof approximately corresponds to said fundamental frequency; and F. Means coupled to the output of the filter and responsive to said fundamental frequency to indicate the flow rate.

* * * * *